Aug. 3, 1965 M. MUELLER ETAL 3,198,101
COMBINED SHUTTER AND DIAPHRAGM ASSEMBLY
Filed Aug. 24, 1962
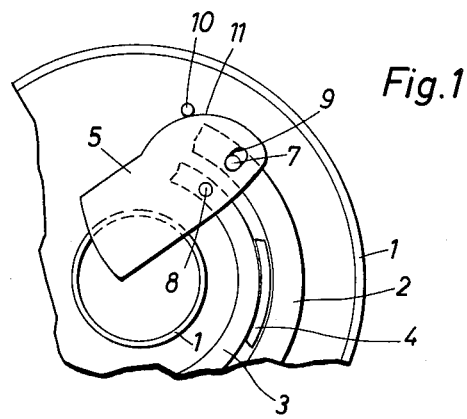
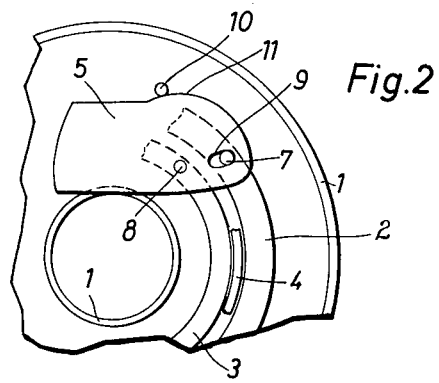
INVENTOR.
MANFRED MUELLER
WILLI SCHULZ
BY Michael S. Striker
Atty

United States Patent Office 3,198,101
Patented Aug. 3, 1965

3,198,101
COMBINED SHUTTER AND DIAPHRAGM ASSEMBLY
Manfred Mueller, Donaueschingen, and Willi Schulz, Schwenningen, Germany, assignors to Agfa Aktiengesellschaft, Leverkusen-Bayerwerk, Germany
Filed Aug. 24, 1962, Ser. No. 219,217
Claims priority, application Germany, Aug. 30, 1961, A 17,152
6 Claims. (Cl. 95—63)

The present invention relates to cameras.

More particularly, the present invention relates to camera shutter constructions and especially to that type of camera shutter wherein the shutter blades are capable also of acting as a diaphragm.

In constructions of this latter type it often happens that when the shutter blades are moved from their closed to their open position the shock resulting from the termination of the movement of the shutter blades before they change their direction of movement so as to return to the closed position of the shutter sets up undesirable vibrations which deleteriously effects the operating characteristics of the shutter.

It is accordingly a primary object of the present invention to provide a construction where shock and vibration of the shutter blades will be very greatly reduced.

A further object of the present invention is to provide a structure which will eliminate such shock and vibrations particularly in shutter assemblies where the shutter blades also act as diaphragm blades.

The invention also includes the provision of a structure which while capable of accomplishing the above objects also is extremely simple and occupies an extremely small amount of space so that it can be incorporated into a shutter assembly without difficulty.

With these objects in view the invention includes, in a camera shutter assembly where the shutter blades also act as a diaphragm, a rotary shutter-driving ring and a concentric aperture-selecting ring, the common centers of these rings being in the optical axis. The shutter-driving ring turns back and forth through the same angle to open and close the shutter irrespective of the selected aperture, and the aperture-selecting ring is turned with respect to the shutter-driving ring in order to select a given exposure aperture. The assembly includes a plurality of shutter blades and a means which provides a pivotal connection between each shutter blade and one of the rings and a pin-and-slot connection between each blade and the other of the rings. In accordance with the present invention there is provided a stop-pin which engages at least one of the blade when it is in the position providing a selected aperture, which is to say when it has reached the position where it stops moving away from its starting position and is about to move back in the opposite direction to the position where the shutter is closed, and as a result of this engagement between at least this one blade and the stop-pin precisely at this moment the vibrations and shock which might otherwise occur in the blade are reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 fragmentary illustrates one possible structure according to the present invention, the structure being shown at the moment when the selected aperture is provided, and the aperture which has been selected with the parts in the position of FIG. 1 is a relatively small one; and FIG. 2 shows the structure of FIG. 1 in the position where the selected exposure aperture also is provided, but in the case of FIG. 2 a relatively large exposure aperture has been selected.

Referring now to FIGS. 1 and 2, there is shown therein the shutter housing 1 in which is located the rotary aperture-selecting ring 2 which is capable of being manually turned by the operator for selecting an exposure aperture. Thus, an unillustrated handle connected to the ring 2 can extend to the exterior of the shutter housing and cooperate with a scale of exposure apertures in a manner well known in the art so that the operator can in this way place the ring 2 in an angular position which will provide the desired selection of exposure aperture. Also located within the shutter housing 1 is a rotary shutter-driving ring 3 which turns back and forth through the same angle in order to open and close the shutter, and it will be noted that the rings 2 and 3 are concentric, and furthermore the center of the rings 2 and 3 is located in the optical axis. In order to maintain the coaxial relationship between the rings 2 and 3 as well as to guide them for rotary movement a guide 4 forming part of the shutter housing extends between the rings 2 and 3, as illustrated in FIG. 1.

The shutter assembly also includes a plurality of shutter blades 5 which also serve as diaphragm blades, and, for the sake of clarity, only one shutter blade 5 is illustrated. A means connected each blade 5 to the rings 2 and 3 for pivotal movement with respect to one of the rings and for providing a pin-and-slot connection with respect to the other of the rings. Thus, in the illustrated example the ring 3 fixedly carries a plurality of pins 8 which respectively extend into mating openings formed in the blades 5 so that in this way the blades 5 are pivotally connected to the ring 3, and the blades 5 are each formed with an elongated slot 9 and the aperture-selecting ring 2 fixedly carries a plurality of pins 7 which respectively extend into the several slots 9 of the blades 5, so that each blade 5 has, in the illustrated example, a pin-and-slot connection to the aperture-selecting ring 2.

With the construction illustrated in FIGS. 1 and 2 and described above, before an exposure is made the operator will turn the ring 2 so as to select the exposure aperture, and the result will be that the extent to which the several blades 5 overlap each other will be changed but in all possible positions of the ring 2 the blades 5 maintain the shutter closed. When the shutter is released to make an exposure the shutter-driving ring 3 will turn through a given angle first in one direction and then in the opposite direction with the result that the several blades 5 will turn about the pins 7, respectively, while the slots 9 move along these pins 7, and during the initial movement of the ring 3 from its starting position the blades 5 move outwardly away from the optical axis so as to provide an exposure, and the size of the opening which is formed by the blades 5 when the ring 3 reaches the end of its turning movement from its starting position determines the exposure aperture. Thus, in accordance with the preselected angular position of the ring 2 the opening which is made by the blades 5 will have a selected size, so that in this way it is possible for the blades 5 to function both as a diaphragm and as a shutter. In the angular position of the ring 2 shown in FIG. 1 the blades 5 will be turned through a relatively small distance away from the optical axis during the turning of the ring 3 from its starting position so as to provide a small aperture, while with the position shown in FIG. 2 the same angle of turning of the ring 3 will displace the blades 5 to a much greater extent so as to provide a much larger aperture, and thus the preselected position of the ring 2 will provide a selected exposure aperture. Of course, when the ring 3 returns to its starting position the blades 5 again return to their overlapping relationship closing the shutter and terminating the exposure. The retarding of the movement of the ring 3 to provide a selected exposure time takes place in a conventional manner well known in the art.

With this construction when the ring 3 turns from its starting position it must come to a stop and change its direction of movement after it turns through a given angle from its starting position, and in coming to this stop in order to change its direction and turn back to its starting position there is provided a shock on the blades 5 which causes them to vibrate in the open position of the shutter, and this vibration of the blades 5 provides less than the very best type of shutter operation. In accordance with the present invention, in order to avoid such vibration of the blades 5 there is provided for at least one of the blades, but preferably for each of the blades, a stop-pin 10 which is in-engaged by an edge of the blade at the instant when it provides the largest opening, which is to say at the instant when it provides the selected exposure aperture or at the instant when the ring 3 stops turning away from the starting positon. As a result of the engagement of the blade 5 with the stop-pin 10 the movement of the blade 5 itself is braked and it immediately comes to rest so that the undesirable vibrations wil be avoided. While it is possible to provide a single stop-pin for one blade 5, it is preferred to provide a plurality of stop-pins which will respectively be engaged by the several blades 5 when the latter are in their outermost positions providing the selected exposure aperture.

In order to provide a structure where the edge portion 11 of the blade 5 will engage the stop-pin 10 in all selected angular positons of the ring 2, it is necessary to provide the edge portion 11 with a certain curvature so that this result will be obtained. In the illustrated example the curvature of the edge portion 11 is that of an arc of a circle whose center is in the axis of the pin 8, so that the center of the circle along which the edge portion 11 extends is in the pivot axis of the blade 5, and with this particular example the curvature of the edge portion 11 is such that irrespective of the preselected angular position of the blade 2 the edge portion 11 will engage the stop pin 10 at all selected exposure apertures precisely at the instant when the blades 5 reach their outermost positions, as is evident from FIGS. 1 and 2 which respectively show the outermost positions of the blades 5 for a relatively small aperture and a relatively large aperture, respectively. Since in the illustrated example the pins 8 are fixed to the ring 3 for turning movement therewith and since the ring 3 always turns through the same angle from its initial position it follows that irrespective of the selected aperture the pins 8 will always be in the same positions at the end of the turning movement of the ring 3 away from its starting position. Therefore, by providing an edge 11 which extends along a circle whose center is in the pin 8 the part of the edge 11 which engages the stop-pin 10 will always be at the same radial distance from the pin 8 irrespective of the preselected angular position of the ring 2, so that in this way with the structure of the invention vibration of the blades 5 will be reliably prevented at all selected apertures.

Of course, the invention is not necessarily limited to each of the details described above and shown in the drawings. For example, it is possible to connect the pins 7 and 8 to the blade 5 and to provide the ring 3 with an opening to receive the pin 8 and the ring 2 with a slot to receive the pin 7. Also, it is possible to provide a pin-and-slot connection at the ring 3 and the pivotal connection at the ring 2.

The pin or pins 10 can be made either of plastic, or plastic with a steel insert, or completely out of steel, depending upon the forces to which these pins are subjected.

As was indicated above, it is preferred to provide each blade 5 with a stop-pin 10, and this will be done in almost all cases wherever the space permits such a construction. It is only in those cases where the arrangement of the parts is such that there is not space available for a plurality of pins 10 for the plurality of blades 5, respectively, that there might be only one pin 10 for one blade 5.

It will be understood that each of the elements described above, or two or more together, may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera shutter assembly where the shutter blades also act as a diaphragm, in combination, a shutter-driving ring and an aperture-selecting ring, said rings being coaxial and having their center in the optical axis and said shutter-driving ring being turnable back and forth through the same angle to open and close the shutter irrespective of the selected aperture while said aperture-selecting ring is turnable with respect to said shutter-driving ring before actuation of the shutter to provide a selected aperture; a plurality of shutter blades and means connecting each blade to said rings, said latter means providing a pivotal connection of each blade to one ring and a pin-and-slot connection of each blade to the other ring; and a stop-pin located in the path of movement of at least one blade and engaging the latter when said one blade provides the aperture selected by said aperture-selecting ring and is located in the position it takes just at the instant when it changes direction and turns back to the position where the shutter is closed, whereby the engagement between said blade and said stop-pin reduces the shock and vibrations which might otherwise be present in said blade.

2. In a camera shutter assembly where the shutter blades act as a diaphragm, in combination, a shutter-driving ring and an aperture-selecting ring, said rings being coaxial and having their center in the optical axis and said shutter-driving ring being turnable back and forth through the same angle to open and close the shutter irrespective of the selected aperture while said aperture-selecting ring is turnable with respect to said shutter-driving ring before actuation of the shutter to provide a selected aperture; a plurality of shutter blades and means connecting each blade to said rings, said latter means providing a pivotal connection of each blade to one ring and a pin-and-slot connection of each blade to the other ring; and a stop-pin located in the path of movement of at least one blade and engaging the latter when said one blade provides the aperture selected by said aperture-selecting ring and is located in the position it takes just at the instant when it changes direction and turns back to the position where the shutter is closed, whereby the engagement between said blade and said stop-pin reduces the shock and vibrations which might otherwise be present in said blade, the means which connects each blade to said shutter-driving ring including a pin which engages said shutter-driving ring and the edge of said one blade which engages said stop-pin extending along an arc of a circle whose center is in the pin which engages said shutter-driving ring.

3. In a camera shutter assembly wherein the shutter blades also serve as a diaphragm, in combination, a shutter-driving ring and a concentric aperture-selecting ring, said rings having their common center in the optical axis and said shutter-driving ring being turnable back and forth between the same angle at each actuation of the shutter to open and close the same while said aperture-selecting ring is turnable with respect to said shutter-driving ring for selecting a given exposure aperture; a plurality of shutter blades each having a pivotal connection with said shutter-driving ring and a pin-and-slot connection with said aperture-selecting ring so that when the latter is turned to select a given aperture the overlapping relationship of the blades change without opening the shutter; and at least one stop-pin located in the path of movement of at least one blade and engaging the latter at the moment when it provides the selected aperture and is about to change its direction of movement to return to the closed position of the shutter so that said stop-pin by engagement with said blade reduces the shock and vibrations which might otherwise occur therein.

4. In a camera shutter assembly wherein the shutter blades also serve as a diaphragm, in combination, a shutter-driving ring and a concentric aperture-selecting ring, said rings having their common center in the optical axis and said shutter-driving ring being turnable back and forth between the same angle at each actuation of the shutter to open and close the same while said aperture-selecting ring is turnable with respect to said shutter-driving ring for selecting a given exposure aperture; a plurality of shutter blades each having a pivotal connection with said shutter-driving ring and a pin-and-slot connection with said aperture-selecting ring so that when the latter is turned to select a given aperture the overlapping relationship of the blades change without opening the shutter; and at least one stop-pin located in the path of movement of at least one blade and engaging the latter at the moment when it provides the selected aperture and is about to change its direction of movement to return to the closed position of the shutter so that said stop-pin by engagement with said blade reduces the shock and vibrations which might otherwise occur therein, the edge of said one blade which engages said stop pin extending along an arc of a circle whose center is in the axis of pivotal turning of said one blade with respect to said shutter-driving ring.

5. In a camera shutter assembly wherein the shutter blades also serve as a diaphragm, in combination, a shutter-driving ring and a concentric aperture-selecting ring, said rings having their common center in the optical axis and said shutter-driving ring being turnable back and forth between the same angle at each actuation of the shutter to open and close the same while said aperture-selecting ring is turnable with respect to said shutter-driving ring for selecting a given exposure aperture; a plurality of shutter blades each having a pivotal connection with said shutter-driving ring and a pin-and-slot connection with said aperture-selecting ring so that when the latter is turned to select a given aperture the overlapping relationship of the blades change without opening the shutter; and at least one stop-pin located in the path of movement of at least one blade and engaging the latter at the moment when it provides the selected aperture and is about to change its direction of movement to return to the closed position of the shutter so that said stop-pin by engagement with said blade reduces the shock and vibrations which might otherwise occur therein, the pivotal connection to said shutter-driving ring being formed by a pin carried by the latter ring and an opening of the blade which receives said pin and the pin-and-slot connection of each blade to said aperture-selecting ring being formed by a slot in each blade and a pin carried by the latter ring and received in said slot.

6. In a camera shutter assembly wherein the shutter blades also serve as a diaphragm, in combination, a shutter-driving ring and a concentric aperture-selecting ring, said rings having their common center in the optical axis and said shutter-driving ring being turnable back and forth between the same angle at each actuation of the shutter to open and close the same while said aperture-selecting ring is turnable with respect to said shutter-driving ring for selecting a given exposure aperture; a plurality of shutter blades each having a pivotal connection with said shutter-driving ring and a pin-and-slot connection with said aperture-selecting ring so that when the latter is turned to select a given aperture the overlapping relationship of the blades change without opening the shutter; and at least one stop-pin located in the path of movement of at least one blade and engaging the latter at the moment when it provides the selected aperture and is about to change its direction of movement to return to the closed position of the shutter so that said stop-pin by engagement with said blade reduces the shock and vibrations which might otherwise occur therein, the edge of said one blade which engages said stop pin extending along an arc of a circle whose center is in the axis of pivotal turning of said one blade wth respect to said shutter-driving ring, the pivotal connection of each blade to said shutter-driving ring being formed by a pin carried by the latter ring and extending into an opening of each blade and the pin-and-slot connection of each blade to said aperture-selecting ring being formed by a pin carried by the latter ring and a slot of each blade which receives said latter pin.

References Cited by the Examiner
UNITED STATES PATENTS

| | | | |
|---|---|---|---|
| 798,595 | 9/05 | Brueck | 95—63 |
| 2,953,076 | 9/60 | Leuschke | 95—63 |

JOHN M. HORAN, *Primary Examiner.*